Figure 1:
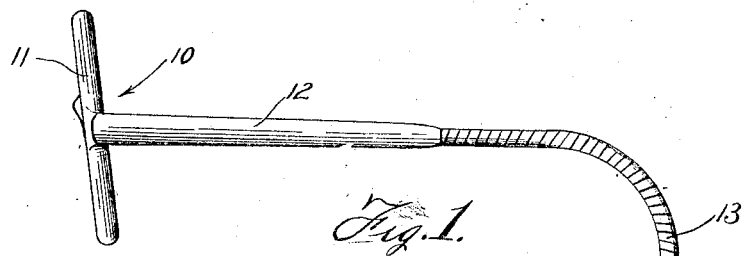

Sept. 14, 1926.

W. H. BOUTELLE 1,599,871

TEMPLE

Filed Jan. 11, 1924

INVENTOR
W. H. BOUTELLE.
BY
Harry H. Styll
ATTORNEY

Patented Sept. 14, 1926.

1,599,871

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEMPLE.

Application filed January 11, 1924. Serial No. 685,550.

The present invention relates to an improved form of cable temple for use in connection with the so-called all celluloid form of ophthalmic mounting.

A very important object of my invention is to provide a temple of this nature that may be flexed, the said temple being so constructed that when it is flexed, loose hairs or the like will not be caught between the adjacent coils or wrappings to cause discomfort to the wearer.

Another object of my invention is to provide a new and novel form of strip with which to wrap a cable temple so that it will be necessary to have but one wrapping to produce the finished cable, the said cable being fully as strong and as neat in appearance and as comfortable in use as the prior art temples.

Other objects and advantages of the invention will become apparent during the course of the following description.

In the drawings wherein like numerals are employed to designate like parts throughout the same:—

Figure 2:
Figure 2:
Figure 3:
Figure 4:
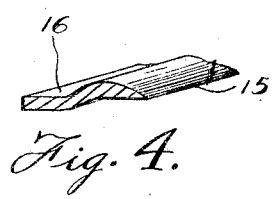

Figure 1 is a side elevation of an ophthalmic mounting illustrating my improved temple in use thereon, Figure 2 is a fragmentary sectional view of my improved temple, Figure 3 shows a strip of cellulose composition material from which my wrappings may be rolled before winding, Figure 4 shows the same after the rolling operation.

In the drawings, wherein for the purposes of illustration is shown the preferred embodiment of my invention, the numeral 10 designates an ophthalmic mounting which includes the frame 11 and the temple 12.

My invention relates particularly to the temple 12 and more particularly to the ear-loop portion 13. To construct this temple an elongated strip of cellulose composition material 14, which is substantially shown in Figure 3, is selected and run through suitable rollers or the like to form an arched portion 15 and a lip 16, such as is shown in Figure 4 of the drawings. After the strip 14 has been rolled as described, it is wrapped upon a suitable core 17 in such a manner that the arched portion 15 of one coil will overlap the lip portion 16 of the next adjacent coil as is clearly shown in Figure 2. It will be seen that by wrapping a strip of the shape described that in reality a double layer of cellulose composition material is had with a single wrapping, thus reducing the amount of time required in the formation of a cable temple, and at the same time permitting the temple to be flexed without unduly separating the adjacent coils, as has heretofore been experienced with a great many forms of flexible temples. Furthermore, the finished temple has a very pleasing appearance and will add to the beauty of such forms of temples.

It will thus be seen that I have provided a temple that is far superior to any temple now in use and that in addition to providing a superior temple, I have eliminated a great deal of work in the manufacture of such temples.

It is to be understood that the form of my invention herewith shown and described is to be taken as the preferred embodiment of the same, and that various changes in the shape, size and arrangement of parts may be resorted to without departing from the spirit of the invention or the scope of the sub-joined claim.

Having thus described my invention, I claim:—

In a device of the character described, a metallic core and a coil of non-metallic material spirally wound thereon, said coil having a flat portion thereof contacting with the core and a beaded recessed offset portion, the face of the recess of the beaded portion being substantially parallel with and spaced from the core and adapted to fit snugly over the flat portion of the coil in contact with the core.

WILLIAM H. BOUTELLE.